US005732931A

United States Patent [19]

Massel

[11] Patent Number: 5,732,931

[45] Date of Patent: Mar. 31, 1998

[54] MOBILE VEHICLE JACK HAVING AN ENGAGEABLE SUPPORT MEMBER

[75] Inventor: Bruno H. Massel, Bensenville, Ill.

[73] Assignee: Bruno's Automotive Products, Inc., Bensenville, Ill.

[21] Appl. No.: 766,225

[22] Filed: Dec. 12, 1996

[51] Int. Cl.$^{6}$ .......... B60P 1/48

[52] U.S. Cl. .......... 254/8 B; 254/2 B; 254/45; 254/93 H; 254/133 R

[58] Field of Search .......... 254/2 B, 8 B, 254/45, 93 H, 133 R, 120, 124

[56] References Cited

U.S. PATENT DOCUMENTS

| | | | |
|---|---|---|---|
| 2,361,690 | 10/1944 | Hunz | 254/2 B |
| 3,967,814 | 7/1976 | Leibundgut | 254/8 B |
| 4,742,991 | 5/1988 | Hung | 254/8 B |
| 4,765,593 | 8/1988 | Hung | 254/8 B |
| 5,221,073 | 6/1993 | Shockley | 254/8 B |
| 5,375,814 | 12/1994 | Marjama . | |

*Primary Examiner*—Timothy V. Eley
*Assistant Examiner*—Lee Wilson
*Attorney, Agent, or Firm*—McAndrews, Held & Malloy, Ltd.

[57] ABSTRACT

A mobile vehicle jack and support is disclosed that may be positioned below a vehicle, raise the vehicle to a selected height, and securely support the vehicle at the selected height. The mobile jack and support includes a frame, a lift arm rotatably coupled to the frame at one end and having a vehicle engagement at an opposite end, and an support member rotatably coupled to the frame.

1 Claim, 2 Drawing Sheets

MOBILE VEHICLE JACK HAVING AN ENGAGEABLE SUPPORT MEMBER

BACKGROUND OF THE INVENTION

The present invention relates to a mobile vehicle jack and support, and more particularly, to a mobile vehicle jack having a vehicle lift arm that raises and lowers a vehicle, and, also having a support member that displaces from a retracted position to engage the vehicle lift arm when the lift arm is in a raised position to form, with the lift arm, a stable vehicle support.

Servicing an automobile or similar vehicle often requires the vehicle to be raised above the ground. When service requires that a person have access to the underside of a vehicle, the vehicle must be raised far enough from the ground to create a work space below the vehicle that is large enough to allow a person beneath the vehicle and provide room to perform service operations. Vehicle service may additionally require the vehicle be raised so that one or more tires of the vehicle are separated from the ground and may also require that the engine drive the entire drive line of the vehicle including driving wheels of the vehicle.

Whether a vehicle is raised to provide access to the underside of the vehicle or to raise tires above the ground, the vehicle must be supported by a structure that is both strong enough to support the weight of the vehicle and sufficiently stable that it will not displace and will prevent the vehicle from falling off the structure.

Conventionally, jacks are used to raise a vehicle to a desired height and to lower the vehicle after service. Jacks conventionally use a hydraulic cylinder or a mechanical apparatus to either raise or lower the vehicle. A jack raises or lowers the vehicle depending on the setting of an apparatus that determines the mechanical function, raising or lowering, of the jack. This apparatus depends on the construction of the jack, however, jacks that rely on such a selectable apparatus to determine whether the jack will raise or lower a vehicle are not considered safe for supporting a vehicle during service due to the possibility that the apparatus setting will inadvertently change or the apparatus will fail allowing the vehicle to lower. Additionally, because jacks are constructed to both raise and lower a vehicle, they are not generally constructed to provide a stable support for the vehicle that prevents horizontal movement of the vehicle or rocking about the jack.

Because jacks are not considered safe for supporting a vehicle during service and are not constructed to provide a stable support, after a vehicle is raised, one or more supporting structures, jack stands, are positioned between the vehicle and the ground. A jack stand conventionally is constructed having a vehicle engaging member that is adapted to be positioned against the underside of the vehicle at a location at which the weight of the vehicle may be supported, and, a base section that is supported on the ground over a support area that is sized to provide a stable support and prevent the jack stand from overturning should the vehicle and vehicle engaging section of the jackstand be jarred or otherwise move during service operations. Jack stands are conventionally constructed to allow the vehicle engaging member to be vertically positioned relative to the base section allowing the jack stand to support a vehicle at various heights above the ground.

Because conventional jack stands are constructed to be used with a variety of vehicles, the vehicle engaging section of the jack stand is generally sized and configured to engage an isolated location on the underside of a vehicle over a small area rendering the jack stand useful for many vehicles. Generally, two or more jack stands must be used to support a vehicle above the ground. Two or more jack stands provide stable vehicle support by supporting the vehicle at separated locations thereby preventing the vehicle from rocking about a single support location.

Raising a vehicle by using a conventional jack and supporting the raised vehicle by an appropriate number of conventional jack stands provides a safe support for vehicle service. As is evident however, raising and supporting a vehicle by this conventional method requires several individual steps: positioning a jack to engage the vehicle; raising the vehicle; positioning one or more jack stands beneath the vehicle; lowering the vehicle onto the jack stand(s); and possibly repeating those steps should the jack be unable, at one position, to raise all portions of the vehicle which must be raised and supported for the required service. Should the time required for these steps be relatively small compared to the time required for vehicle service or the time available for service, as is generally the case for ordinary vehicle service, the time required to raise and support a vehicle in this manner may be considered to be relatively insignificant. When a vehicle must be frequently raised for service, when the time available for service is short, when the method of raising and supporting the vehicle need not be adaptable to a wide variety of vehicles, or any combination of those conditions, the time required to raise and support a vehicle by the conventional method becomes a significant disadvantage. Servicing race cars is subject to all of these conditions.

One known device for overcoming some disadvantages of the conventional methods of raising and supporting a vehicle for service is disclosed by U.S. Pat. No. 5,375,814. That patent discloses a direct lift jack that is constructed to lift a vehicle along a vertical path. The direct lift jack of that patent is configured to have a very low profile so that it can be positioned beneath a vehicle that is to be lifted. (col. 2, lns. 61–63, col. 5, lns. 26–32) The jack engages a vehicle at rod extensions at opposed ends of an elongate cross bar that is generally horizontal. The cross bar is secured to one end of a first member. The first member is guided to lift the cross member along a vertical path by a second member rotatably secured to the first member and to a base frame and by a guide member secured to the base frame. The base frame is positioned beneath a vehicle and maintains a fixed location during lifting of the vehicle (col. 4, lns. 26–36 and lns. 46–49). U.S. Pat. No. 5,375,814 also discloses a brace fork that pivots at one end about the base frame to position an opposite end, that is adapted to engage the cross member, beneath the cross member to vertically support the cross member at a selected height. (col. 5, lns. 33–55)

The direct lift jack of U.S. Pat. No. 5,375,814 is not mobile nor adapted to be easily) positioned beneath a vehicle. To achieve a vertical lift path, the direct lift jack of U.S. Pat. No. 5,375,814 requires that the first and second members be rotatably connected to each other and connected to the base frame at separated locations. The second member is rotatably connected to the base frame, and one end of the first member is guided along the base frame toward the location that the second member is rotatably connected to the base frame. (col. 3, lns. 9–21, col. 5, lns. 27–30) This lift mechanism requires a relatively long base frame resulting in a relatively long apparatus to be positioned beneath the vehicle to be lifted.

Though mechanisms are known that both raise a vehicle to be serviced and support the vehicle in the raised position; a need still exists for a jack and support adapted to lift and securely support a vehicle that is compact and mobile.

BRIEF SUMMARY OF THE INVENTION

In accordance with the present invention, disadvantages of known mechanisms to lift and support vehicles have been overcome. A vehicle jack and support is provided which combines a known compact jack mechanism having a frame that supports the jack at widely spaced locations to provide a stable support for the jack while lifting a vehicle and a support member that engages a lift arm of the jack mechanism at a raised position from spaced apart locations to provide a stable support for the vehicle at a selected height thereby providing greater safety in supporting the vehicle than is provided by the jack mechanism alone.

More particularly, the jack and support of the present invention includes a generally elongate frame, a lift arm positioned generally along the frame and that is rotatably secured to the frame at a driven end and is adapted to engage a vehicle at a vehicle support end. Wheels may be secured to the frame to position the elongate direction of the frame generally parallel to a surface supporting a vehicle and allow the jack and support to be rolled along the surface to position the jack and support. To raise a vehicle, the lift arm is rotated about the frame at the driven end causing the vehicle support end of the lift arm to move upwardly away from the surface supporting the vehicle.

The jack and support also includes a support member is rotatably secured at a first end to the frame at a location separated from the driven end of the lift arm along a direction the lift arm extends from the driven end. The support member extends from the first end generally toward the driven end of the lift arm to a second end adapted to engage the vehicle support end of the lift arm. The length of the support member from the first end to the second end is sized to allow the second end of the support member to engage the vehicle support end of the lift arm when the lift arm is rotated about the frame to position the vehicle support end at a selected location separated from the frame. The first end of the support member and the driven end of the lift arm may be secured to the frame at locations separated by a distance that approximates the distance from the driven end to the vehicle support end of the lift arm providing a compact configuration for the frame, lift arm, and support member.

A drive element engages the lift arm at the driven end causing the lift arm to rotate with respect to the frame thereby raising the vehicle support end of the lift arm a distance above the frame. The support member is rotated about the first end to position the second end between the vehicle support end of the lift arm and the frame. The vehicle support end of the lift arm engages the second end of the support member upon lowering of the lift arm. The support member, lift arm, and frame then form a vehicle supporting structure that does not require the drive element to act on the lift arm to prevent the lift arm from rotating and lowering the vehicle.

The support member of the jack and support of the present invention comprises two bars, positioned on opposed sides of the lift arm and rotatably secured to the frame at locations separated from the lift arm to provide a support along a horizontal direction perpendicular to the lift arm.

The drive element is preferably a hydraulic cylinder having a rod extending to engage the driven end of the lift arm so that extension of the rod from the cylinder causes the lift arm to rotate to raise the vehicle engaging end.

Accordingly, an object of the present invention is to provide a compact vehicle jack and support.

Another object of the present invention is to provide a mobile vehicle jack and support.

Yet another object of the present invention is to provide a vehicle jack and support that will securely support a vehicle at a desired height above the ground.

A further object of the present invention is to provide a mobile vehicle jack and support that will lift a vehicle to a desired height and provide a stable support more quickly than known devices.

Yet a further objective of the present invention is to provide an apparatus that will lift a vehicle and support the vehicle at spaced locations providing a stable and safe support for the vehicle that resists horizontal displacement and overturning.

Still another object of the present invention is to provide a vehicle jack and support that will form a structure which supports a vehicle at a selected height after the jack lifts the vehicle.

These and other objects and advantages of the present invention, as well as details of the preferred embodiment thereof, will be more fully understood from the following description and the drawings.

In the following detailed description, spatially orienting terms are used such as "left", "right", "vertical", "horizontal", "upper", "lower", and the like. It is to be understood that these terms are used for convenience of description of the preferred embodiments by reference to the drawings. These terms do not necessarily describe the absolute location or orientation in space, such as left, right, upward, downward, etc., that any part must assume.

DETAILED DESCRIPTION OF THE INVENTION

Figure 1:
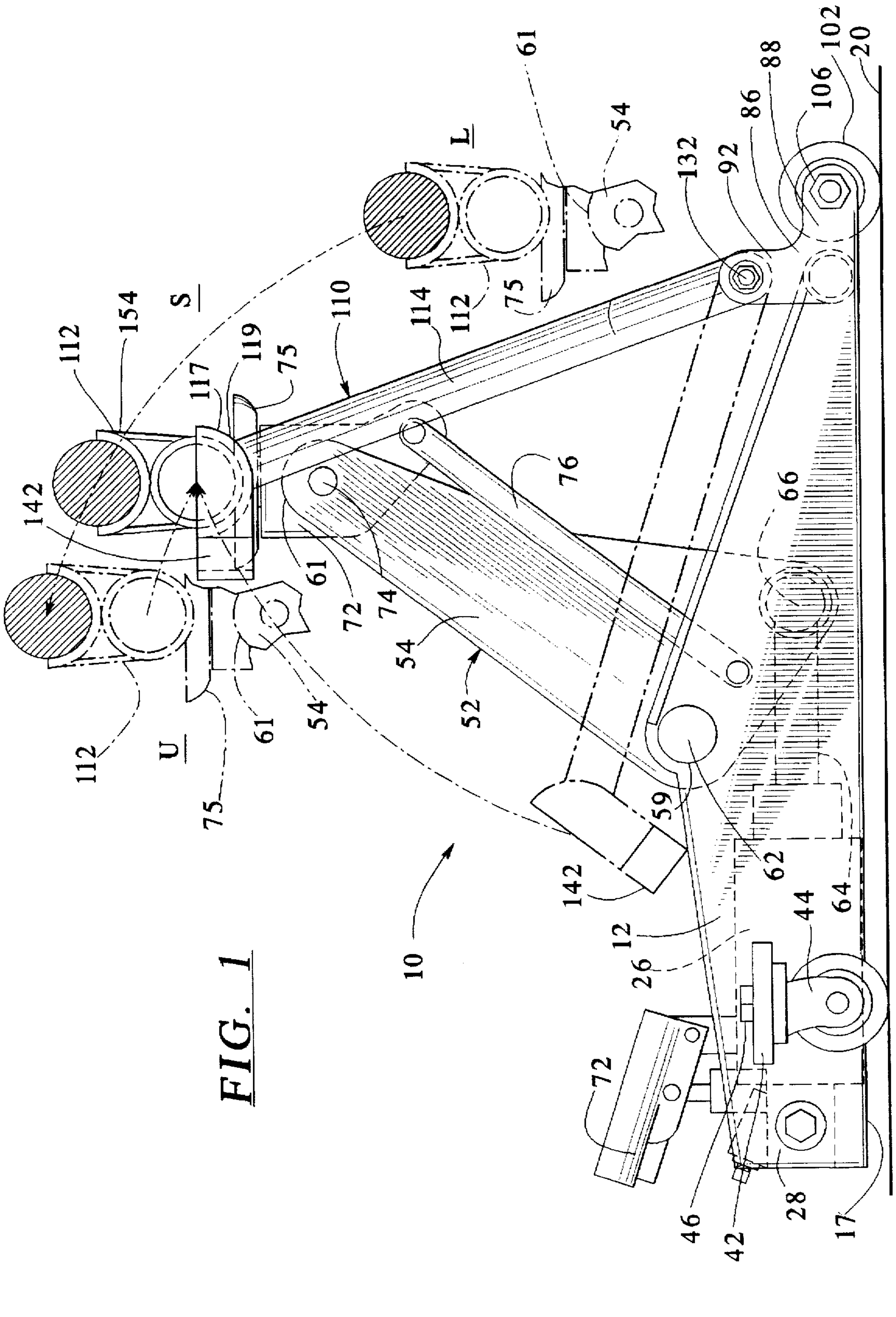
FIG. 1 is a side view of a mobile jack and support of the present invention showing the supporting position and also showing, in phantom, the retracted position of the support arm and the fully lowered and fully extended positions of the lift saddle.

FIG. 1 shows a mobile jack 10 according to the present invention. The jack 10 includes two parallel spaced apart side rails 12 and 14 one shown by FIG. 1). The side rails 12 and 14 are generally elongate and in parallel spaced relation, each extending from a rearward end 16 and 18, respectively, to a forward end 22 and 24, respectively. When the jack 10 is in use, side rails 12 and 14 extend in a generally horizontal direction, as shown by FIG. 1. The side rails 12 and 14 each have a lower edge, 17 and 19 respectively, that are adjacent to and separated from the surface 20 on which the jack is supported and from which the vehicle is to be lifted. As used herein, the downward direction refers to the direction toward the supporting surface 20 and the upward direction refers to the direction away from the supporting surface 20. As also used herein, the forward direction refers to the direction toward the forward ends 22 and 24 from the rearward ends 16 and 18 of the side rails 12 and 14. The rearward direction is opposite the forward direction.

A hydraulic cylinder 26 is positioned between and extending along the side rails 12 and 14. A head 28 of the hydraulic cylinder 26 is positioned generally adjacent to the rearward ends 16 and 18 of the side rails 12 and 14. The hydraulic cylinder 26 extends from the head 28 toward the forward ends 22 and 24 of the side rails 12 and 14. The head 28 includes two projections 32 extending oppositely to abut a surface of one of the side rails 12 and 14 adjacent to the hydraulic cylinder 26. Each projection 32 defines a threaded hole opening adjacent to the abutted side rail. The side rails 12 and 14 each define a hole adjacent to a projection 32 through which a threaded portion of a bolt 36 extends and engages the threaded hole in the projection 32. A head of the bolt 36 abuts a washer 37 through which the threaded portion of the bolt 36 extends. The washer 37 abuts an outer surface of a side rail 12 or 14 opposite the opposing side rail. The bolt 36 thereby secures the head 28 to the side rails 12 and 14.

A generally planar tab 42 is mounted to each of side rails 12 and 14 at an outer surface of the side rail opposite the opposing side rail at a location near the rearward end of the side rail. The tabs 42 extend from the side rails and define a hole through which a threaded mounting shaft of a caster 44 extends. The caster 44 has a wheel positioned between the tab 42 and the supporting surface 20 and a threaded shaft extending through the tab 42. A nut 46 engages the threaded shaft on a side of the tab 42 opposite the supporting surface 20 securing the caster 44 to the tab 42. The tabs 42 are positioned on the side rails 12 and 14 so that the wheels of the casters 44 extend below the lower edges 17 and 19 of the side rails 12 and 14 to support the side rails 12 and 14 above a supporting surface 20.

A lift arm 52 is generally elongate and has a U-shaped cross section defined by generally parallel side walls 54 and 56 and a center section 58 extending from the side wall 54 to the side wall 56. The side walls 54 and 56 are spaced from each other by a distance that allows the lift arm 52 to be positioned between the side rails 12 and 14. As best shown by FIG. 1, the lift arm 52 is positioned between the side rails 12 and 14 having the side walls 54 and 56 extending from the center section 58 generally toward the lower edges 17 and 19 of the side rails 12 and 14. The lift arm 52 is elongate extending from a rearward end 59 positioned adjacent to and forward of the hydraulic cylinder 26 to a forward edge 61. The side wall 54 is parallel to and separated from side rail 12 and the side wall 56 is parallel to and separated from side rail 14.

A rod 62 extends through the side rails 12 and 14 at a location generally adjacent to and forward of the hydraulic cylinder 26 and upward from the hydraulic cylinder 26. The lift arm 52 is positioned between the side rails 12 and 14 so that the rod 62 extends through holes defined by the side walls 54 and 56 near the rearward end 59. As shown by FIG. 1, the lift arm 52 extends from the rod 62 toward the forward ends 22 and 24 of the side rails 12 and 14.

The side walls 54 and 56 of the lift arm 52 extend toward the lower edges 17 and 19 of the side rails 12 and 14 adjacent to the rearward end 59 to a location generally adjacent to the hydraulic cylinder 26. A rod 64 extends forwardly from the hydraulic cylinder 26 between the side walls 54 and 56 adjacent to the rearward end 59. The rod 64 includes a cross bar 66 extending toward the side rails 12 and 14 at the farthest extent of the rod 64 from the hydraulic cylinder 26. The cross bar 66 extends through holes defined by the side walls 54 and 56 of the lift arm 52 at a location separated from and generally downward from the rod 62.

The hydraulic cylinder 26 drives the rod 64 forwardly when the jack lever 71 is operated by a handle (not shown) repeatedly rotating the lever 71. As the rod 64 extends from the hydraulic cylinder 26, the lift arm 52 is driven at the rearward end 59 by the rod 64 extending from the hydraulic cylinder 26 to rotate about the rod 62 causing the forward end 61 of the lift arm 52 to move upwardly and rearwardly. When the rod 62 is fully retracted into the cylinder 26, the lift arm 52 rotates about the rod 62 to position the forward end 61 of the lift arm 52 in a lowered position L as shown in phantom by FIG. 1. In the lowered position, the forward end 61 of the lift arm 52 is positioned generally adjacent to and upwardly separated from the forward ends 22 and 24 of the side rails 12 and 14. When the rod 62 is fully extended from the cylinder 26, the lift arm 52 rotates about the rod 62 to position the forward end 61 of the lift arm 52 in an upper position U as shown in phantom by FIG. 1. In the upper position, the forward end 61 of the lift arm 52 is located generally upwardly from the rod 62 at a position that is upwardly and rearwardly separated from the location of the forward end 61 in the lowered position by a distance approximately, though less than, the distance from the rearward end 59 to the forward end 61 of the lift arm 52.

A lift member 72 is positioned between the side walls 54 and 56 of the lift arm 52 adjacent to the forward end 61 of the lift arm 52. A rod 74 extends through holes defined by the side walls 52 and 54 and the lift member 72 pivotally coupling the lift member 72 to the lift arm 52. A seat 75 is supported by the lift member 72 at a location upward from and adjacent to the center section 58 of the lift arm 52. The seat 75 is pivotally connected to the lift member 72 to rotate about a vertical, that is upward to downward, axis. The seat 75 is a cupped disk that opens upwardly.

As shown by FIG. 1, the lift member 72 extends downwardly from the lift arm 52 to a location below the lower edges 17 and 19 of the side walls 54 and 56. Two guide arms 76 are positioned between the lift arm 52 and the side rails 12 and 14. One guide arm 76 is positioned between the side wall 54 and the side rail 12 and a second guide arm 76 is positioned between the side wall 56 and the side rail 14. Each guide arm 76 is pivotally connected to the adjacent side rail, 12 or 14, at a location forward from and downward from the rod 62. Each guide arm 76 extends from the connection to the side rail to the portion of the lift member 72 that extends downwardly from the lift arm 52. Each guide arm 76 is pivotally connected to the lift member 72. The length of the guide members 76 and the locations of connections to the side rails 12 and 14 and the lift member 72 are chosen to cause the lift member 72 to be guided by the lift arm 52 and the guide arms 76 during raising and lowering of the lift arm 52 so that the lift member 72 does not rotate but rather translates during raising and lowering of the lift arm to maintain the support seat 75 in an upwardly opening orientation. The configuration of lift arm 52, lift member, 72, and guide arms 76 required to guide this movement are well known and therefore will not be further described.

Figure 2:
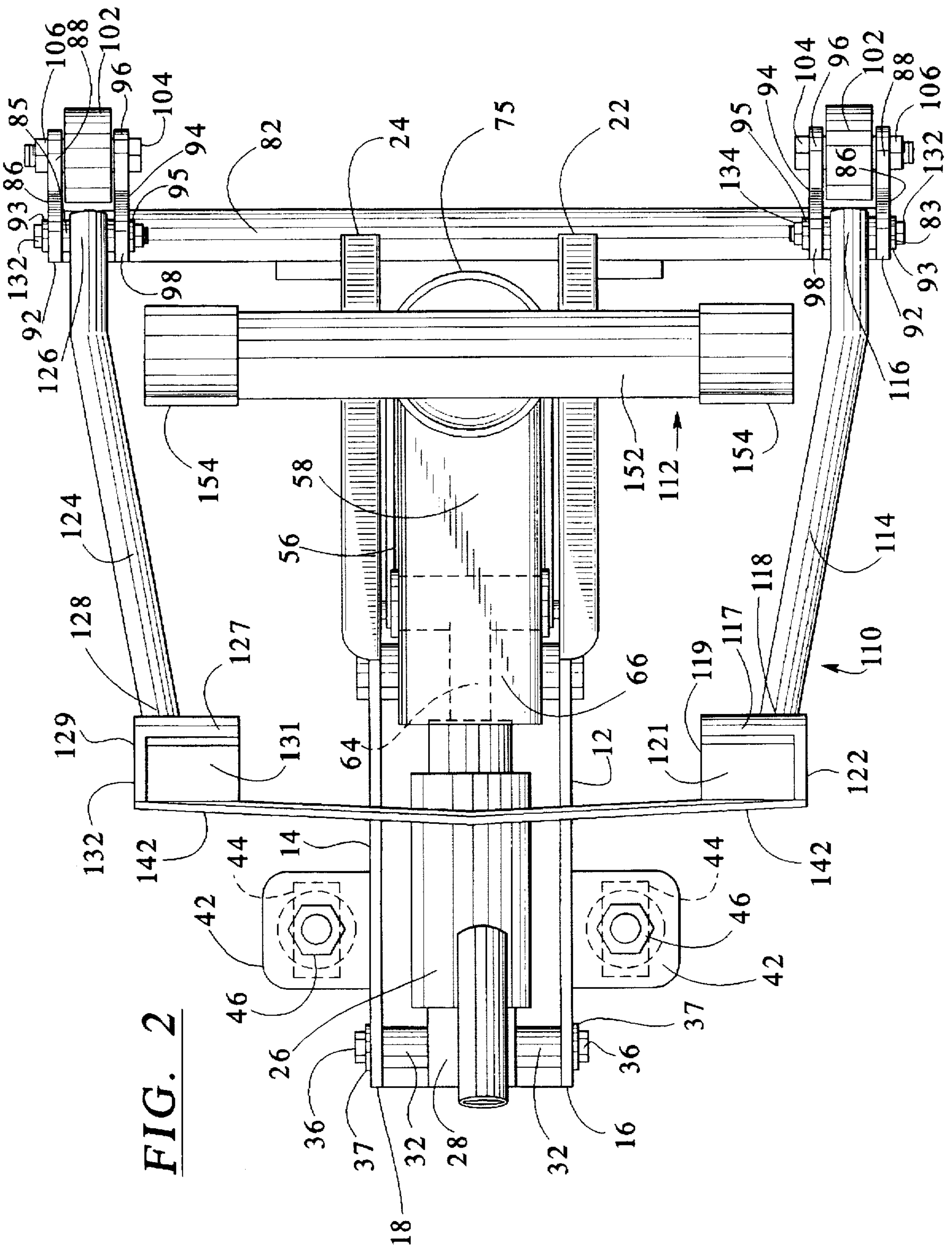
FIG. 2 is a top view of the jack and support of FIG. 1 showing the lift arm in a partially raised position and the engageable support in the retracted position.

As best shown by FIG. 2, a front axle 82 is secured to the forward ends 22 and 24 of the side rails 12 and 14 and extends substantially outwardly beyond the side rails 12 to an outer end 83 and beyond the side rail 14 to an outer end 85. At each of the outer ends, 83 and 85, an L-shaped outer bracket 86 is secured to the axle 82. Each outer bracket 86 has a leg 88 extending forwardly and a leg 92 extending upwardly. An L-shaped inner bracket 94 is secured to the axle 82 at a distance along the axle 82 from the outer bracket 86. The inner bracket 94 has forwardly extending leg 96 that is parallel to the leg 88 of the outer bracket 86. The inner bracket 94 also has an upwardly extending leg 98 that is parallel to the leg 92. The outer bracket 86 and the inner bracket 94 are spaced from each other to accept a wheel 102 therebetween.

The wheel 102 is positioned between the forwardly extending legs 96 and 88. The forwardly extending legs 96 and 88 define aligned holes. The wheel 102 is positioned so that a central hole in the wheel 102 is aligned with the holes in the legs 96 and 88. A bolt 104 extends through the holes in the legs 96 and 88 and the hole in the wheel 102 allowing the wheel 102 to rotate about the bolt 104. A head of the bolt 102 abuts the inner bracket 94 opposite the wheel 102 and a nut 106 engages a threaded portion of the bolt 104 extending through the outer bracket 86 opposite the wheel 102 and abuts the outer bracket 86 opposite the wheel 102.

A vehicle support member 110 includes two support arms, 114 and 124. A first end 116 of the support arm 114 is positioned between the upwardly extending legs 98 and 92 inner bracket 94 and outer bracket 96 at the end 83 of the axle 82. Similarly, a first end 126 of the support arm 124 is positioned between the upwardly extending legs 98 and 92 inner bracket 94 and outer bracket 96 at the end 85 of the axle 82. A hole extends through each of the first ends 116 and 126 of support arms 114 and 124 from adjacent the inner bracket 94 to the outer bracket 86. The upwardly extending legs 92 and 98 of the outer bracket 86 and the inner bracket 94, respectively, each form aligned holes that are adjacent to hole formed by the first end of the support arm positioned between the inner bracket 94 and the outer bracket 88. A bolt 132 extends through the aligned holes in the upwardly extending legs 92 and 98 and the first end of the support arm, 116 or 126, positioned therebetween. As best shown by FIG. 2, a head of the bolt 132 abuts a washer 93 adjacent to the surface of the outer bracket 86 facing oppositely from the side rails 12 and 14 and a threaded portion of the bolt 132 extends toward the side rails 12 and 14 from the inner bracket 94. A nut 134 engages that threaded portion of the bolt 132 and abuts a washer 95 adjacent to the inner bracket 94 on a surface facing the side rails 12 and 14. The support arms 114 and 124 pivot about the bolt 132 at the first ends 116 and 126, respectively.

The support arms 114 and 124 extend from the axle 82 to a second end, 118 and 128, respectively. As presently preferred, the support arms 114 and 124 extend toward the side rails 12 and 14. Seats 119 and 129 are secured to the second ends 118 and 128, respectively. As best shown by FIG. 1, seats 119 and 129 define a concave seat surface opening away from the support arms 114 and 124 and define a surface that is generally cylindrical about an axis that is approximately perpendicular to the side rails 12 and 14. The seats 119 and 129 have a forward portion 117 and 127, respectively, forming the forwardmost section. The forward portions 117 and 127 extend from the support arms 114 and 124, respectively, defining the cylindrical surface to curve to approach the direction of support arm. The seats 119 and 129 have a rear portion 121 and 131, respectively, forming the rear section of the seat. The rear portions 121 and 131 extend rearwardly from the support arms 114 and 124, in a direction that is nearly perpendicular to the support arms 114 and 124 to define a surface that is generally planar.

The vehicle support member 110 also includes a flat connecting bar 142 that joins the seats 119 and 129. The connecting bar 142 is secured to the rearmost extent of rear portions 121 and 131 of the seats 114 and 124. The flat bar extends from the rear portions 121 and 131 away from the support arms 114 and 124, respectively, in a direction that is generally along the support arms 114 and 124, respectively. The connecting bar 142 secures the arms 114 and 124 to each other so that the arms rotate together about the bolts 132 assuring that the seats 119 and 129 are always equally distant from the supporting surface 20.

The seats 119 and 129 have side walls 122 and 132 respectively. The side wall 122 is at the farthest extend of the seat 119 from the side rails 12 and 14 and extends along the direction of the arm 114 from the flat bar 142 to the forward portion 117. The side wall 122 extends from the rear portion 121 away from the arm 114 to the farthest extent of the bar 142 from the rear portion 121. The side wall 122 also extends and from the bar 142 to the farthest extent of the forward portion 117 from the arm 114. The side wall 132 of the seat 129 is at the farthest extent of the seat 129 from the side rails 12 and 14 and extends from the flat bar 142 to the forward portion 127. The side wall 132 extends from the rear portion 131 away from the arm 124 to the farthest extent of the bar 142 from the rear portion 131. The side wall 132 also extends and from the bar 142 to the farthest extent of the forward portion from the arm 124.

A vehicle saddle 112 is secured to the support seat 75. The saddle 112 is includes a cross bar 152 sized to extend across seats 119 and 129 though less than the distance from side wall 122 to side wall 132. The cross bar 152 is secured to the seat 75 to extend oppositely from the seat 75 generally along the direction of the axle 82 to the seats 119 and 129. The cross bar 152 is generally cylindrical and sized to conform to the forward portions 117 and 127 of the seats 119 and 129.

A formed saddle 154 is secured to the cross bar 152 at each of the ends of the cross bar 152. The formed saddles 154 is secured to an upward surface of the cross bar 152 and define concave surfaces that open upwardly. The concave surfaces of the saddles 154 are configured to conform to and partially capture a portion of a vehicle to be lifted. As illustrated, the saddle is configured to conform to a cylindrical portion of the vehicle, such as an axle housing or frame member. As best shown by FIG. 2, the saddles 154 are positioned to engage a vehicle at two separated locations that are adjacent to the support seat 75. As presently preferred, the saddles 154 are separated to engage a rear axle housing at opposite sides of a housing center section which encloses rear end gears.

Operation of the jack and support 10 is best illustrated by reference to FIG. 1. To lift a vehicle, the lift arm 52 is lowered between side rails 12 and 14 and the support member 110 is lowered by rotating the support arms 114 and 124 about the bolts 132 to position the connecting bar 142 against the side rails 12 and 14, as shown in phantom by FIG. 1. The jack 10 is positioned beneath a vehicle by rolling the jack 10 on the casters 44 and wheels 102. The lift arm is raised so that the saddles 154 engage an axle housing of a vehicle to be lifted at locations separated by approximately the length of cross bar 152. This is position L shown by FIG. 1. The vehicle is raised by operating the jack lever 71 of the hydraulic cylinder 26 to raise the lift arm 52 to the position U illustrated by FIG. 1. While the lift arm 52 is in this position, the support member 110 is rotated about the bolts 132 to position the seats 119 and 129 below the cross bar 152. This raised position of the support member 110 is shown by FIG. 1. As shown by FIG. 1, the support arms 114 and 124 are sized to allow the lift arm 52 to position the seats 119 and 129 downwardly from the cross bar 152 when the lift arm 52 is in the uppermost position U. The lift arm is then lowered to the S position illustrated by FIG. 1. Lowering the lift arm 52 cause the forward edge of the lift arm 61, the lift member 72, support seat 75 and cross bar 152 to move forwardly and downwardly. The cross bar 152 bears against the seats 119 and 129 most against the forward portions 117 and 127. Once the cross bar 152 contacts the seats 119 and 129, the support member 110 prevent the cross bar from moving forwardly, and the cross bar prevents the seats 119 and 129 from moving backwards. The support member 110 thereby prevents the lift arm 52 from further rotation about the rod 62 to lower the crossbar 152 and the lift arm 52 prevents further rotation of the support member 110 about the bolts 132 to lower the seats 119 and 129. The lift arm 52 and support member 110 cooperate to support the vehicle by their cooperation with each other. The hydraulic cylinder 26 is not required to prevent the forward end 61 of the lift arm 52 from lowering.

To lower the vehicle, the lift arm 52 is raised by operating the jack lever 71 of the hydraulic cylinder 26 to raise the lift arm 52 to the position U illustrated by FIG. 1. As shown by FIG. 1, this motion moves the cross bar 152 and saddles 154 upwardly and rearwardly away from the seats 119 and 129. The support member 110 is then rotated about the bolts 132 to the L position as shown by FIG. 1. The vehicle may then be lowered by retracting the rod 66 into the hydraulic cylinder 26 allowing the lift arm 52 to rotate about the rod 62 lowering the forward end 61 of the lift arm 52.

As is evident to those of skill in the art, the jack 10 rolls on the wheels of casters 44 and wheels 102 and may be conveniently positioned beneath a vehicle as is conventional of known floor jacks. The jack 10 of the present invention has a cross bar 152 having saddles 154 to support a lifted vehicle at separated locations thereby diminishing the tendency of the vehicle to rotate on the jack about an axis that along the forward to rearward direction as compared to a conventional jack. Additionally, when in the support, S, position the saddles 154 are supported by the arms 114 and 124 of the support member 110 which extend from the saddles 154 to locations separated from the side rails 12 and 14 along the axle 82. This configuration provides direct support to the saddles 154 at locations separated from the seat 75.

Typically a lifted vehicle is supported at a location along the forward to rearward direction in addition to the support provided by the jack 10. That additional support prevents the vehicle from rotating about an axis along the direction of the cross bar 152. The saddles 154 are configured to conform to the lifted location of the vehicle preventing the vehicle from moving forwardly or rearwardly from the saddles. Additionally, in the support, S, position the lift arm 52 and the support member 110 extend from the saddles 154 along the rearward and forward directions, respectively, providing structural strength along that direction.

A jack and support member according to the present invention provides support for a vehicle that is more stable than that provided by conventional jacks. The jack and support of the present invention provides a larger base of support on a supporting surface 20 than conventional jacks. The jack and support of the present invention contacts the supporting surface 20 at separated locations along the side rails 12 and 14 by the casters 44 and wheels 102, as is conventional, and is also supported at locations separated from the side rails 12 and 14 along a direction perpendicular to the side rails 12 and 14 by the wheels 102 at outer ends 83 and 85 of the axle 82 providing enhanced stability in this direction as compared to conventional jacks. The jack and support of the present invention engages a vehicle at separated locations at opposed ends of the cross bar 152 providing more stable engagement of the vehicle than is provided by conventional jacks. The side rails 12 and 14, the lift arm 52, cross bar 152, and support member 110 engage each other to form a structure which supports a vehicle without requiring a jack mechanism which lifts the vehicle, such as the hydraulic cylinder 26, to exert or support any load. The jack and support member of the present invention can thereby support a vehicle without the danger of failure of a jack lifting mechanism failing and allowing the vehicle to be lowered.

Modifications and variations of the present invention are possible in light of the above teachings. Thus, it is to be understood that, within the scope of the appended claim, the invention may be practiced other than as described above.

I claim:

1. A mobile vehicle jack and support comprising:

two parallel spaced apart generally elongate side rails forming a frame extending in an elongate direction from a forward end to a rearward end;

a lift arm having a forward end and a rearward end;

the lift arm positioned between the side rails of the frame between the forward and rearward ends of the frame and the forward end of the lift arm extending toward the forward end of the frame;

the lift arm rotatably connected to the frame at a location near the rearward end of the lift arm;

a lift member at the forward end of the lift arm;

a cross bar extending from a first end to a second end, the cross member secured to the lift member at a location between the first and second ends of the lift member so that the cross bar extends from the lift member to position the first end and the second end at locations that are separated from the lift member;

the cross bar having a first saddle at the first end and a second saddle at the second end, the first and second saddles configured to conform to locations of a vehicle;

an elongate axle extending from a first end to a second end, the axle secured between the first and second ends of the axle to the forward end of the frame, the axle extending generally perpendicular to the elongate direction of the frame and sized to position the first and second ends of the axle at locations separated from the frame;

a support member rotatably connected to the axle at a first location near the first end of the axle and at a second location near the second end of the axle and extending toward the rearward end of the frame;

the support member extending from the first location near the first end of the axle and the second location near the second end of the axle to form seats that are positioned and adapted to accept the first and second ends of the cross bar when the lift arm is rotated with respect to the frame to a position at which the lift member is at a selected distance from the frame whereby the lift arm is rotated about the frame to raise a vehicle engaged by the saddles of the cross bar and the support member can be rotated to engage the cross bar to form with the lift arm, frame, and axle a structure to support the vehicle.

* * * * *